Dec. 11, 1962 A. SILVER 3,067,616
FLUID PRESSURE DETECTOR
Filed Oct. 27, 1958
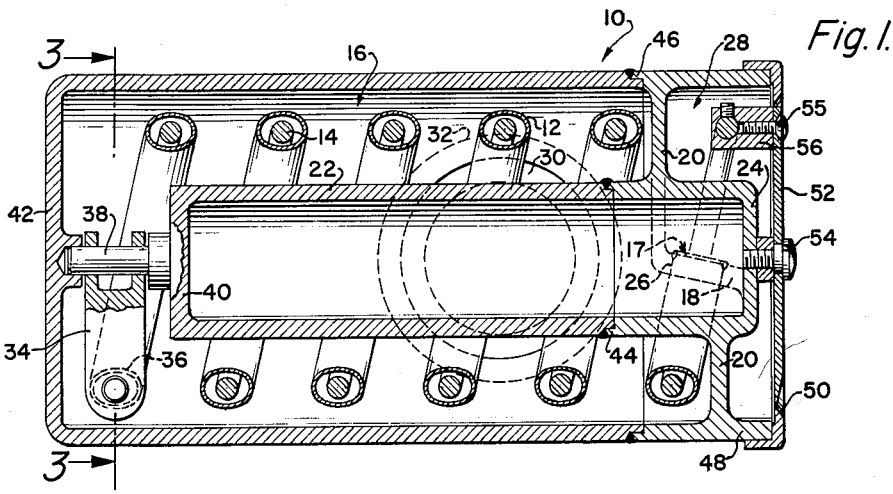
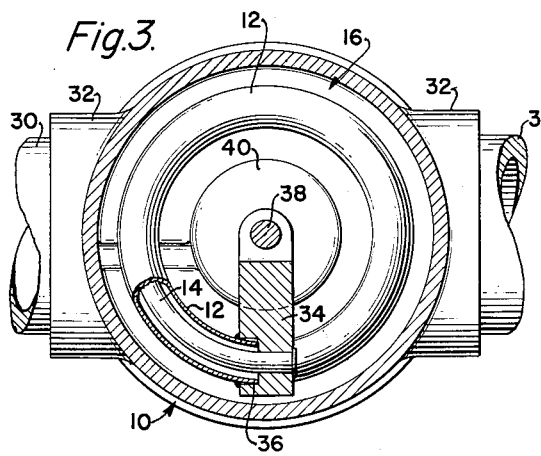
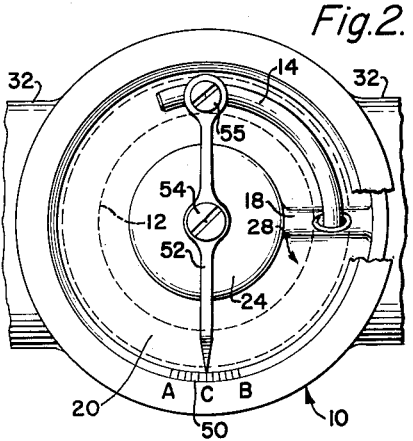
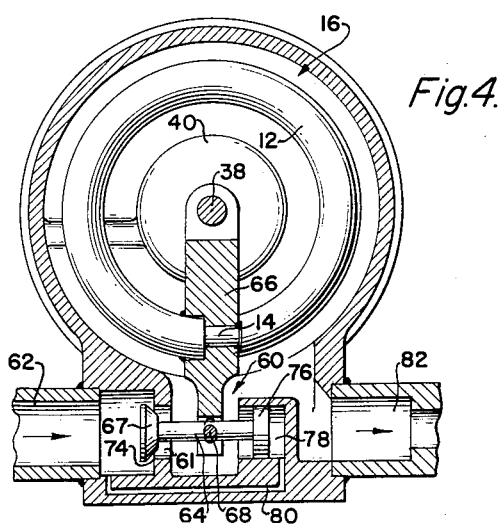
INVENTOR:
ALEXANDER SILVER,
BY
Attorney.

United States Patent Office 3,067,616
Patented Dec. 11, 1962

3,067,616
FLUID PRESSURE DETECTOR
Alexander Silver, East Woodland Hills, Calif., assignor to The Garrett Corporation, Los Angeles, Calif., a corporation of California
Filed Oct. 27, 1958, Ser. No. 769,865
6 Claims. (Cl. 73—411)

The present invention relates to fluid pressure detectors and more particularly to fluid pressure detectors in which the sensing element is deflected by fluid pressures.

In fluid pressure detection, it is often necessary to sense pressures within sealed enclosures having thick walls for withstanding high pressures, corrosive fluids and the like, without destroying the integrity of the enclosure. In addition, it may be desirable to actuate valves or other devices within the enclosure at predetermined pressures. In many instances, visible indication of the magnitude of fluid pressures inside the sealed enclosure may be advantageous. Often, this requires transmission of motion of a sensing element from inside to outside the enclosure. Any one or all of these features can be found in the present invention, in which fluid pressure may be detected inside a sealed enclosure by a fluid pressure detector element including a curved tubular member or sensing element which is deflected in response to fluid pressures. Preferably, an elongated member is disposed within the tubular sensing element, the elongated member being substantially non-responsive to the fluid pressure differential on the element. The resulting combination provides a fluid pressure detector in which relative movement between the elongated member and the sensing element is produced in response to varying pressures.

In the preferred arrangement as illustrated, the sensing element comprises a flat tube or envelope which may be elliptical in cross-section. Preferably, the tubular sensing element takes the form of a coil or helix which is responsive to fluid pressure differentials across a wall thereof to vary the radius of curvature of the element as a function of the fluid pressure differentials. The elongated member disposed within the tubular sensing element should be smaller in cross-section than the inside of the tubular sensing element to permit relative movement laterally and axially. Further, the elongated member may take the form of a rod which is coupled to the movable element of an indicator located outside the enclosure.

In an alternate arrangement, a fluid pressure regulator has been provided in which a flattened tubular sensing element projects into a sealed enclosure through a sealed opening in the wall of the enclosure. The sensing element provides an actuating means for a valve controlling the passage of the fluid through inlet and outlet conduits in the sealed enclosure. Since the sensing element is deflected in response to fluid pressure, the amount of deflection of the element is a function of the fluid pressure. Accordingly, the valve is adapted to control admission of fluid through the inlet to regulate the fluid pressure in the enclosure in response to the deflection of the sensing element.

Preferably, a fluid pressure gage is provided having a coiled tubular sensing element or member which has a closed movable end portion and a fixed end portion secured to an opening in a sealed enclosure. The closed movable end portion may be connected to an arm which is rotatably mounted in the enclosure to provide for pivoting of the movable end portion about the axis of the coil. A coiled rod disposed within the tubular member may also be connected to the arm to move with the closed end of the tubular member. The remainder of the rod is free to move relative to the tube and the opposite end is connected to an indicator member rotatably mounted on the outside of the enclosure. The indicator member is mounted for rotation about an axis coaxial with the longitudinal axis of the coils. A dial or other indicia may be fixed relative to the enclosure and positioned adjacent to the indicator member to indicate the distance of relative movement of the tubular member and the rod and the pressure inside the enclosure if the dial is so calibrated.

It is an object, therefore, to provide fluid pressure apparatus having the foregoing features and advantages.

Another object of the present invention is the provision of a fluid pressure sensing element for detecting pressures inside a sealed enclosure.

Another object is to provide a fluid pressure sensing element responsive to a varying fluid pressure differential to vary its radius of curvature.

A further object of the invention is the provision of fluid pressure regulating apparatus for sealed enclosures in pressure systems in which the sensing element actuates the valve directly.

Still another object is to provide a gage for measuring fluid pressures in hermetically sealed enclosures wherein the indicator is located outside of the enclosure.

Other objects and features of the invention will become apparent to those skilled in the art as the disclosure is made in the following detailed description of the invention as illustrated in the accompanying sheet of drawing in which:

FIG. 1 is a longitudinal section of a preferred embodiment of the invention;

FIG. 2 illustrates an elevation or end view of the apparatus shown in FIG. 1;

FIG. 3 is a vertical section taken along the line 3—3 of FIG. 1 looking in the direction of the arrows; and FIG. 4 illustrates an alternate embodiment of the device.

Referring now to the drawing, wherein like reference characters designate like or corresponding parts throughout the several views, there is shown in FIG. 1, which illustrates a preferred embodiment, a gage 10 for measuring fluid pressure in a hermetically sealed enclosure including a helically coiled tubular member or sensing element 12 and a coiled rod 14 disposed within the tubular sensing element, both projecting into a hermetically sealed tubular enclosure 16 through a hermetically sealed opening 17 in an inclined portion 18 of an end wall 20. The end wall 20 is joined integrally with an inner tubular case 22 wherein both the enclosure 16 and inner case 22 have a common end wall portion 24. End portion 26 of the tubular member 12 is secured around the edges of the end wall about the sealed opening by welding, brazing or the like to hermetically seal the interior of the enclosure or casing 16.

The hermetically sealed enclosure 16 provides an elongated chamber for the tubular sensing element 12 whereby the sensing element may be subjected to pressures in a fluid pressure system which may be coupled into the enclosure 16 by conduits 30 joining the enclosure at bosses 32.

The fluid pressure detector is operated by the variations in the radius of curvature of the sensing element 12 in response to fluid pressures within the enclosure 16. Variations in radius of curvature of the tubular member 12 vary its effective length as a function of the fluid pressures. An arm 34, coupled to the movable end portion 36 supports the tubular member 12. The arm 34 is mounted for rotation about an axis coaxial with the longitudinal axis of the helix formed by the coils of the tubular member 12 on a stub shaft 38 projecting axially from end wall 40 of the inner tubular case 22 into a bearing formed in an end wall 42 of the sealed enclosure 16.

As shown, the casings 16 and 28 may be formed in sections and secured to one another along annular seams 44 and 46 after assembly of the detector. Cylinder 48 extending the enclosure 16 projects past the end wall 20 to form an open annular enclosure for common end wall portion 24 and the inclined portion 18. A radially extending annular flange fits over the cylinder 48 providing a dial 50 cooperating with a pointer 52 for indicating the fluid pressures in the enclosure 16.

In FIG. 3, the coiled rod 14 is shown secured to the arm 34 along with the end of the tubular member 12. As the pressure inside enclosure 16 varies, the radius of curvature of the tubular member 12 varies so as to rotate the arm 34 about the shaft 38. Since the coiled rod 14 is not responsive to fluid pressures in the enclosure 16, the rod moves relative to the tubular member 12 and also the enclosure 16. In order to indicate the movement of the tubular member 12 in response to fluid pressures, the opposite end portion of the rod 14 projects out of the tubular member 12 and the enclosure 16 and is connected to suitable means such as the pointer 52. Fluid pressures in the enclosure 16 will then be indicated as the pointer is moved across the scale. The dial 50 may be suitably calibrated to convert the movement of the rod 14 by the pressure sensitive element 12 into increments of fluid presure. As shown, the pointer 52 may be rotatably mounted on the shoulder of screw 54 to pivot about an axis coaxial with the coiled member 12 while an end 55 opposite the calibrations or indicia is secured to the rod 14 by an axial extension 56.

In operation, a predetermined fluid pressure in the enclosure 16 positions the pointer 52 at C, as shown in FIG. 2. Changes in pressure will move the pointer 52 across the dial indicating the magnitude and direction of the changes. Movement of the pointer in the direction towards A indicates an increasing pressure. An increase in presure decreases the radii of curvature of the tubular member 12, moving the arm 34 counterclockwise, as viewed in FIG. 3. Since the coiled rod 14 is connected to the arm 34, it is retracted further into the tubular member 12 moving the pointer 52 clockwise, as viewed in FIG. 2.

Movement of the pointer 52 towards B results from a decreasing pressure in the enclosure 16 causing the radius of curvature of the tubular member 12 to increase as a function of decreasing fluid pressures. Increasing radius of curvature of the coiled tubular member 12 moves the arm 34 clockwise as shown in FIG. 3. As before, the coiled rod 14 transmits the movement of the arm 34 outside of the enclosure 16 moving the pointer 52 towards B to indicate decreasing pressures. Thus, the movements of the coiled tubular member 12 in response to fluid pressures in enclosure 16 are coupled outside of the enclosure without destroying the integrity of the enclosure. The incremental movement of the pointer relative to increments of pressure may be varied by controlling the cross-sectional contour of the tubular member, the thickness of the wall of the tubular member, and the length of the tubular member. For example, tubular members having thinner walls are more sensitive to fluid pressure variations; a tubular member having a greater number of turns will produce a proportional increase in movement for a given incremental change in pressure; and the flatter the cross-section of the tubular member is, the more sensitive it is to pressure variations.

In FIG. 4, an alternate embodiment of the invention has been shown in which fluid pressure in the enclosure 16 is regulated by the coiled sensing element 12 controlling a valve 60. In this embodiment, the valve 60 is shown preferably to be of the balanced poppet type valve which controls the size of an inlet opening 61 to the enclosure 16. An inlet conduit 62 is connected to a source of pressure, not shown, supplying fluid under pressure to the enclosure 16 and a fluid pressure system coupled to the enclosure by conduit 82. The valve 60 includes a balanced poppet element 64 which is attached to the outer end of a modified valve actuating arm 66 by suitable means such as pin 68 which is secured to the valve stem by passing the pin through the elongated slot in the forked end of the arm 66. A valve disc 67 is positioned in the inlet opening 61 to regulate its size and to close the opening completely upon engaging a valve seat 74. The valve poppet is balanced by a piston 76 attached to the opposite end of the valve element 64. The piston 76 is disposed for axial movement in a balancing chamber 78. Chamber 78 is connected to the inlet conduit 62 by an equalizing passageway 80 so as to balance the forces acting on the poppet valve. The conduit 82 is shown aligned with the inlet. The conduit 82 may be connected to a pressure relief valve, for example, or to a part of the pressure system.

In the operation of FIG. 4, in addition to indicating the pressure in the same manner as in the previous embodiment which of course would be an optional feature in this instance, the coiled tubular sensing element 12 controls a valve 60 to regulate the pressure in the enclosure 16. Further, the pressure sensing element may operate to either close the inlet opening or provide for a predetermined increment of opening of the inlet to maintain a predetermined pressure in the enclosure and pressure system or both. As before, a decreasing fluid perssure in the enclosure 16 causes the tubular sensing element 12 to increase its radius of curvature moving the arm 66 clockwise as shown in FIG. 4. As shown in FIG. 4, this movement of the arm 66 increases the size of the inlet opening by moving the valve element to the left. As a result of the increase in size of the inlet opening, the flow of fluid from the pressure source into the enclosure 16 is increased to return the pressure in the enclosure to the predetermined or regulated pressure level. In the event the pressure in the enclosure 16 exceeds the regulated pressure level, the radius of curvature of the tubular member 12 is decreased moving the arm 66 counterclockwise to decrease and ultimately close off the inlet opening by seating a valve disc 67 along the valve seat 74.

Obviously many modifications and variations of the present invention are possible in the light of the above teachings. For example, in the modifications shown in FIGS. 1 to 3, the rod 14 is an actuator and can be used to operate switches, valves, or other equipment capable of being operated by a movable actuator element including other indicators. In the alternate embodiment shown in FIG. 4, the electrical or mechanical switches as well as valves can be operated, for example, to control compressor motors or other equipment. The movable end of tubular member 12 or the arm 66 can be considered an actuator to operate any equipment which is capable of being operated by a movable element.

While certain preferred embodiments of the invention have been specifically disclosed, it is understood that the invention is not limited thereto, as many variations will be readily apparent to those skilled in the art.

I claim:

1. Fluid pressure responsive means comprising a tubular sensing element of noncircular cross-section coiled to a uniform radius and having fixed and free ends with its free end hermetically sealed and disposed in a region of fluid pressure, the fixed end of said element being sealed from said fluid pressure so that only the exterior surface of the element is exposed to said pressure, and a coiled elongated member within said element and having one end attached thereto adjacent the free end thereof to effect relative movement between the member and element as the element moves in response to change in said fluid pressure, the other end of said member extending outwardly of said region to provide sensible indication of said movement.

2. A detector for fluid pressure within an enclosure comprising a tubular sensing element of noncircular cross-section coiled to a uniform radius projecting into said enclosure through a wall thereof, the interior end of said element being sealed and movable within the enclosure, a circumferential surface of said element being hermetically sealed to the enclosure wall, and a member disposed within said element and having one end connected thereto adjacent to the interior end thereof to effect relative movement between the member and element as the element moves in response to change in said fluid pressure, the other end of said member extending outwardly of said enclosure to provide sensible indication of said movement.

3. A detector for fluid pressure within an enclosure comprising a uniformly curved tubular sensing element of noncircular cross-section projecting into said enclosure through a wall thereof, the interior end of said element being sealed and movable within the enclosure, a circumferential surface of said element adjacent to its outer end being hermetically sealed to the enclosure wall, an elongated member disposed within and extending exteriorly of said element and connected thereto adjacent to its interior end to effect relative movement between the member and element as the element moves in response to change in said fluid pressure, and means connected to the exterior end of said member to perform an intelligence function.

4. A detector for fluid pressure within an enclosure comprising a tubular sensing element of substantially elliptical cross-section and bent in a helical curve of uniform radius so as to be movable in response to variation in fluid pressure exerted thereon, said element projecting into said enclosure through a wall thereof, the interior end of said element being hermetically sealed and movable within the enclosure, a circumferential surface of said element adjacent to its outer end being hermetically sealed to the enclosure wall, an elongated member having an outer diameter less than the interior width of the element and disposed therein and extending exteriorly thereof, said member being connected to said element adjacent to its interior end for common movement thereat to effect movement of the exterior end of said member as the free end of the element moves within the enclosure in response to change in said fluid pressure, and means at the exterior of said enclosure connected to the exterior end of said member to perform an intelligence function.

5. A gage for measuring fluid pressures in hermetically sealed enclosures comprising: a helically coiled tubular member having a closed movable end portion, a fixed end portion and an elliptical cross-section; said tubular member projecting into said enclosure through a hermetically sealed opening therein and responsive to varying pressures in said enclosure to vary its radius of curvature; an arm coupled to the movable end portion and rotatably mounted in the enclosure for rotation about an axis coaxial with the longitudinal axis of the coils of the tubular member, a helically coiled rod disposed within the tubular member, said tubular member and said rod having limited freedom of movement relative to one another to permit relative axial and radial movements over the majority of their length in response to varying pressures, pressure indicator means including an indicator member rotatably mounted on the outside of the enclosure for rotation about an axis coaxial with longitudinal axis of the coils of said tubular member, and means for connecting an end of the rod to said indicator member for indicating the distance of relative movement and the pressure inside the enclosure.

6. Apparatus for simultaneously regulating fluid pressure within a sealed enclosure and externally indicating the value of said pressure comprising: an inlet conduit and an outlet conduit communicating with said enclosure; valve means disposed internally of said enclosure and operable to control the passage of fluid from said inlet conduit to said outlet conduit; a tubular member of oblate cross-section coiled about a longitudinal axis, said member having an open end fixedly supported in a wall of said enclosure and communicating with the exterior thereof through a hermetically sealed aperture in said wall, and a closed end disposed interiorly of said enclosure for rotation about said axis in response to pressure variation in said enclosure; an arm operatively connecting said closed end with said valve means for movement thereof, said arm being pivoted for rotation about said axis; a coiled rod spaced interiorly of said tubular member for limited movement relative thereto, said rod having a first end connected with the closed end of said tubular member and a second end emergent from the open end of said member; pressure indicating means disposed exteriorly of said enclosure and including an indicator member pivoted for rotation coaxially of said arm; and means operatively connecting said second end of said rod with said indicator member whereby said indicating means and said valve means will be operated concurrently by response of said tubular member to pressure variations within said enclosure.

References Cited in the file of this patent
UNITED STATES PATENTS

| | | |
|---|---|---|
| 2,088,569 | Beecher | Aug. 3, 1937 |
| 2,243,398 | Sewell | May 27, 1941 |
| 2,307,838 | Jacobsson | Jan. 12, 1943 |
| 2,351,047 | Hughes | June 13, 1944 |
| 2,450,625 | Beecher | Oct. 5, 1948 |
| 2,530,068 | McCabe | Nov. 14, 1950 |
| 2,810,800 | Hasselhorn | Oct. 22, 1957 |
| 2,894,532 | Gaylord | July 14, 1959 |